Aug. 27, 1929.  A. J. WALLACE  1,726,326
FISH SCALER
Filed Dec. 31, 1927

Albert J. Wallace, Inventor

By Hobart F. Woodward
Attorney

Patented Aug. 27, 1929.

1,726,326

UNITED STATES PATENT OFFICE.

ALBERT J. WALLACE, OF ALGONAC, MICHIGAN.

FISH SCALER.

Application filed December 31, 1927. Serial No. 243,929.

The purpose of my invention is to provide a convenient and effective means of holding fish while they are being scaled and a device for quickly and effectively removing the scales from the fish, and one which is strong and durable and simple in construction.

I prefer to carry out my invention in substantially the manner shown and hereinafter fully described, and as more particularly pointed out in the claim, reference being had to the accompanying drawings forming a part of this specification in which—

Figure 1:
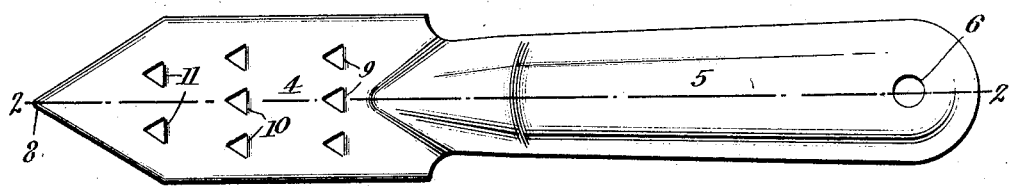
Figure 1 is a perspective view of the fish scaler.
Figure 2:
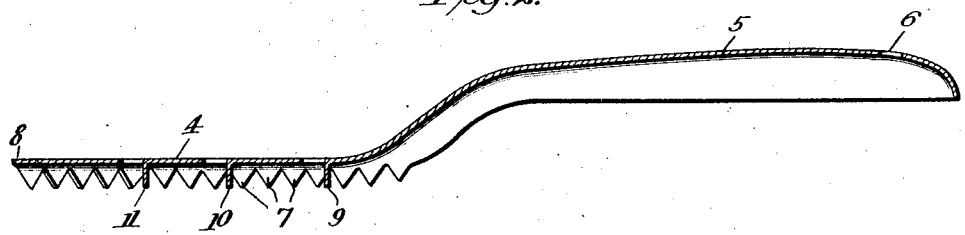
Fig. 2 is a cross section view on line 2—2 of Fig. 1.
Figure 3:
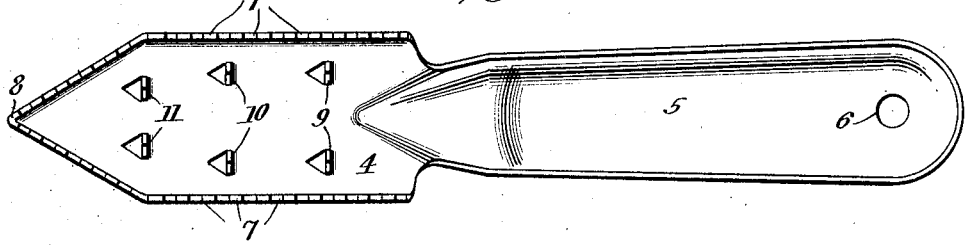
Fig. 3 is a bottom view.

The fish scaler is constructed of a single piece of sheet metal and comprises a head 4 armed with teeth, and provided with a handle 5, the latter being cup-shaped to fit the hand while being gripped to scale the fish. The rear end of said handle has an aperture 6 to enable the device to be conveniently hung on a nail or other suitable support when not in use. That part of the scaler which forms the head 4 is flat with edges bent downward, said edges being notched to form teeth 7. The fish scaler terminates in a pointed end 8 which enables the scales to be removed from and around the gills of the fish, places usually not accessible to a blunt nosed scraper, the head being also downwardly offset with respect to the handle so that when the device is in use the hand grasping the handle will not come in contact with the fish which is being scaled.

The head 4 is provided with a plurality of spaced parallel rows of teeth, said rows being formed transversely of the head. These rows of teeth are indicated at 9, 10 and 11, respectively. The rows of teeth are formed by tongues being punched from the sheet metal and then bending said teeth downwardly, the teeth of the several rows being all of uniform length. The side edges of the teeth converge in the direction of the blunt ends whereby a tapered or wedge-shaped tooth is produced. It will be noted that the teeth in rows 9 and 10 contain a like number of teeth while the teeth in row 11 are less than the two rows of teeth 9 and 10; while the teeth in row 9 are located in line with the teeth of row 10, the teeth in row 11 being in line with the spaces between the teeth of rows 9 and 10.

The object of arranging the teeth as heretofore described and the downwardly extending sides carrying teeth and the head 4 converging to a point 8, is to facilitate the removal of the scales. The teeth in row 9 loosen or tear up the scales and the teeth in row 10 completes the removal of the scales previously loosened by action of the other two rows of teeth.

What I claim is:

A fish scaler comprising an elongated toothed plate with an integrally formed handle stamped from a sheet of metal, the handle being bent upwardly so as to lie in a plane sufficiently high above the plane in which the teeth are disposed as to permit the hand of the operator to grasp the handle without coming in contact with the fish being scaled, said tooth plate having teeth extending the entire distance along both sides and across the end and also having teeth arranged in spaced parallel rows in the body of the plate and disposed in longitudinal planes in line with the spaces between the teeth at the forward end of the toothed plate, the toothed plate being so constructed that all the teeth will come into contact with the fish being scaled.

ALBERT J. WALLACE.